United States Patent [19]

Jager

[11] 4,378,488

[45] Mar. 29, 1983

[54] HEATER FOR AN AQUARIUM

[75] Inventor: Wolfgang Jager, Wustenrot-Finsterrot, Fed. Rep. of Germany

[73] Assignee: Ebo-Jager, Inc., El Segundo, Calif.

[21] Appl. No.: 266,365

[22] Filed: May 22, 1981

[30] Foreign Application Priority Data

Jun. 6, 1980 [DE] Fed. Rep. of Germany ....... 3021390

[51] Int. Cl.³ .............................................. H05B 3/06
[52] U.S. Cl. ...................................... 219/523; 119/5; 219/331; 219/345; 219/512; 219/536; 338/301
[58] Field of Search ............... 219/345, 331, 328, 523, 219/528, 536, 541, 544, 548, 437, 512; 119/5; 338/301

[56] References Cited

U.S. PATENT DOCUMENTS

| 1,718,412 | 6/1929 | Crooker et al. | 219/523 X |
| 2,749,425 | 6/1956 | Steiger | 219/523 X |
| 3,041,441 | 6/1962 | Elbert et al. | 219/345 |
| 3,191,004 | 6/1965 | Hocker | 219/345 X |
| 3,265,858 | 8/1966 | MacGuire | 219/345 |
| 3,576,426 | 4/1971 | Sesholtz | 219/523 |
| 3,803,386 | 4/1974 | Rodrigues | 219/523 |
| 3,895,217 | 7/1975 | Hall et al. | 219/523 |
| 3,973,102 | 8/1976 | Mackeem | 219/523 |
| 4,072,847 | 2/1978 | Craven | 219/523 |
| 4,107,514 | 8/1978 | Ellson | 219/523 |

FOREIGN PATENT DOCUMENTS

| 2554234 | 6/1977 | Fed. Rep. of Germany | 219/523 |
| 1169369 | 11/1969 | United Kingdom | 219/523 |

Primary Examiner—Volodymyr Y. Mayewsky
Attorney, Agent, or Firm—Charles H. Schwartz; Ellsworth R. Roston

[57] ABSTRACT

An immersible heater for an aquarium includes a waterproof, heat-resisting, flat plastic case which is tripartitioned in its interior, one chamber holding a flat coil carrier bonded or welded to the case; an upper chamber contains a leaf spring actuated by a bimetallic element; these chambers are separated by a thermally isolating chamber. The bias of the bimetallic actuator is adjusted by a sealed feedthrough screw. Current flow through the heating coil is indicated by a lamp covered with a thinner wall portion of the case. The front of the case carries heat-dissipating and -stiffening ribs; the rear of the case carries suction cups.

10 Claims, 3 Drawing Figures

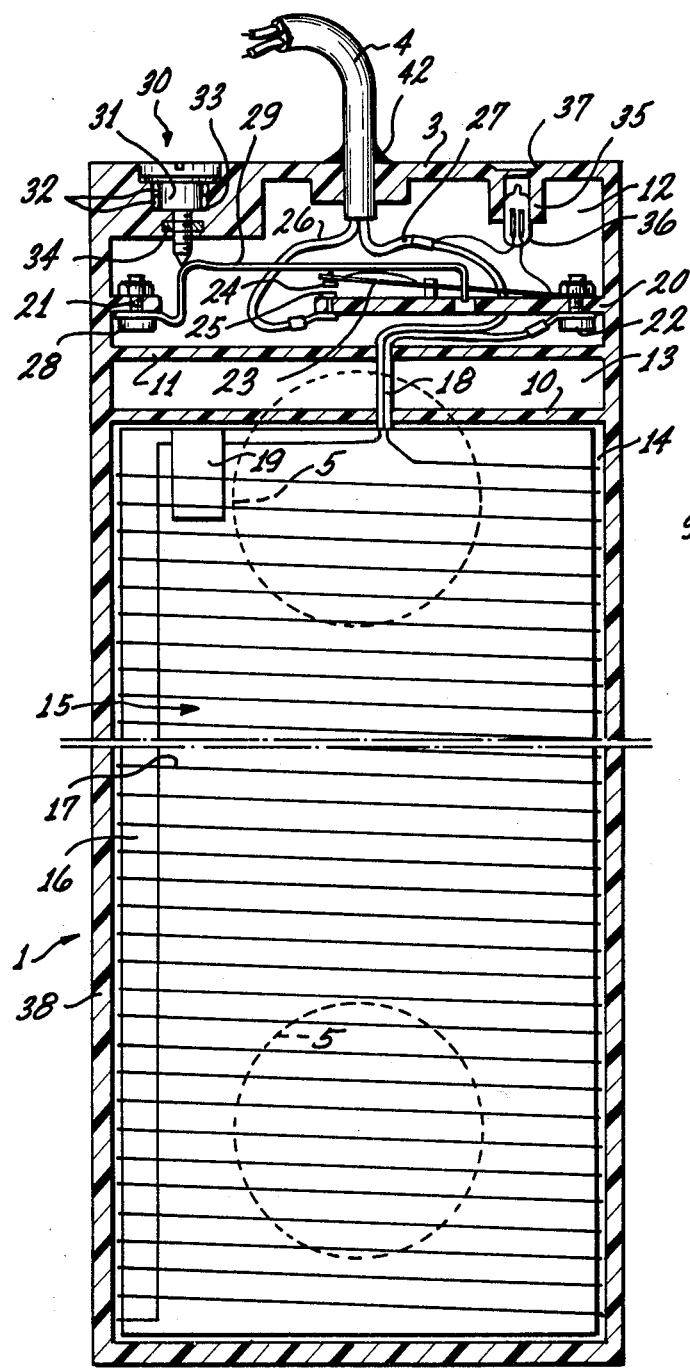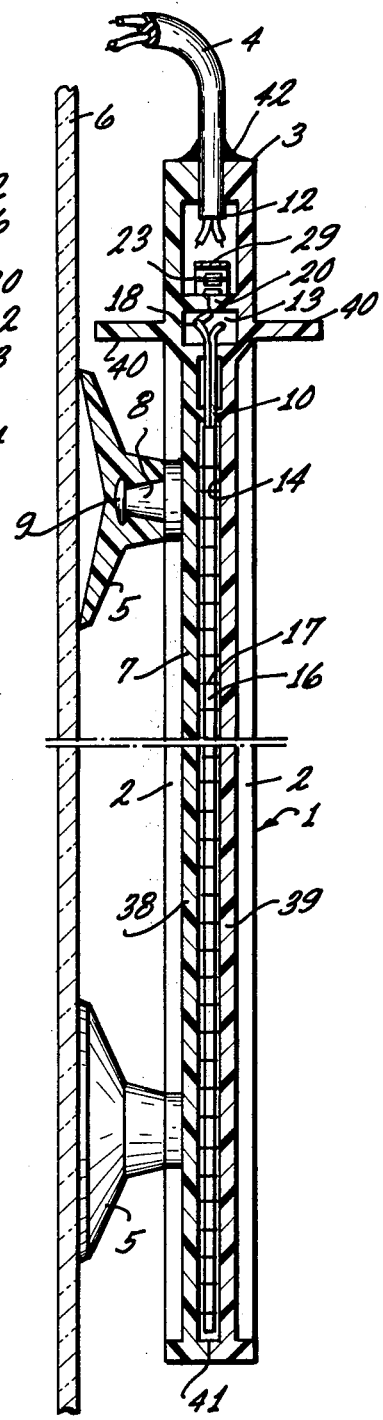

HEATER FOR AN AQUARIUM

BACKGROUND OF THE INVENTION

The present invention relates to an immersible heater for an aquarium; and more particularly, the invention relates to such a heater which includes an electric heating element and a temperature controller, both being contained in a housing or the like.

Heaters of the type to which the invention pertains are used to a rather large extent. The housing is usually of a tubular configuration and is, preferably, made of glass; but metal tubes have been used in some instances. These heaters are by and large acceptable, but particularly glass tubes are prone to damage. Also, the interface between the heater and the surrounding liquid is rather small; increasing the area of that interface requires a larger diameter or a larger length (or both). A larger diameter tube is undesirable for reasons of strength (glass!). Also, a larger tube generally will occupy more space that is lost for the intended purpose of the aquarium. Also, the length of the heater tube is limited by the height of the aquarium.

In view of the foregoing, it seems apparent that a larger heating power requires a higher temperature of the heater. That, however, is undesirable since it may lead to unduly high temperature gradients inside the aquarium.

DESCRIPTION OF THE INVENTION

It is an object of the present invention to provide a new and improved heater for aquariums which exhibits an increased heating power but without requiring an increase in its operating temperature.

In accordance with the preferred embodiment of the present invention, it is suggested to provide the heater as a flat heating element inside a flat, plate-like case made of heat-resisting and thermally resisting synthetic material. The flat configuration increases the overall surface area that is in heat exchange relation with the surrounding water. The heater, thus, occupies comparatively little space in the aquarium. Also, its flat contour may match side or end dimensions of the aquarium.

Avoidance of glass and use of a synthetic material permits sealing of the interior of the case with comparative ease. The use of synthetic material permits construction of the case as a flat, plate-like configuration which is not feasible, e.g., in the case of glass. The enlarged surface area, in turn, permits actual reduction in local temperature by and of the heating element in the heater.

The case is preferably made of two parts or open shells, and the interior is preferably partitioned; a lower, rather large chamber contains the flat heating element, an upper chamber contains the temperature controller, constructed preferably as an on/off, leaf-spring-like switch operated by a bimetallic element. This controller is preferably thermally isolated as much as possible, e.g., by an in between chamber and by means of external flow deflectors so that the heated water does not flow directly along the wall of the chamber containing the temperature controller.

The controller may include an adjustment screw and an indicator lamp. A temperature limit switch may also be provided for sensing the temperature in the chamber that contains the heating element. One external wall of the case may be provided with suction cups. This wall may carry posts for seating and retaining these suction cups. Suitable mounting ridges are provided in the chamber containing the regulation.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

FIGS. 2 and 3 are respectively section views along lines 2—2 and 3—3 in FIG. 1.

Figure 1:
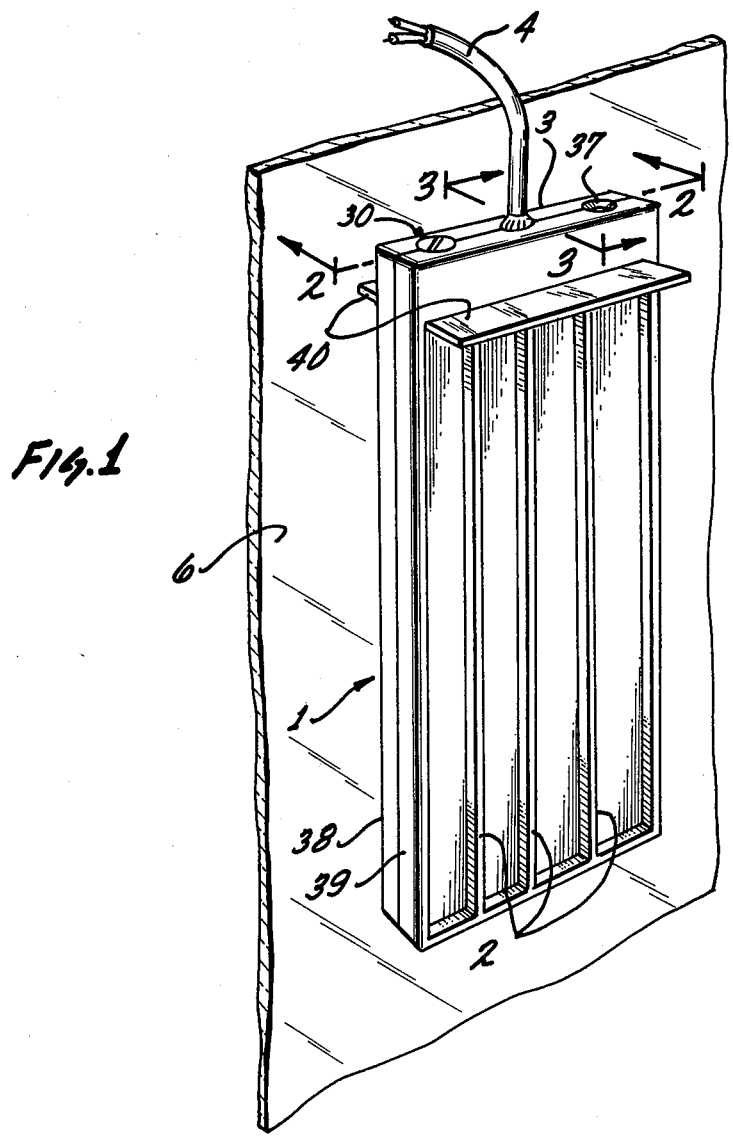
FIG. 1 is a perspective overall view of a heater for an aquarium in accordance with the preferred embodiment of the invention for practicing the best mode thereof.

Proceeding now to the detailed description of the drawings, the figures illustrate a heater having a housing or case 1 which has the contour of a flat, parallelepiped. The depth is small as compared to the height and the width of the case, but the case is higher than it is wide. Longitudinal stiffening ribs 2 extend from one flat side of case 1, e.g., from the front. These ribs reenforce the wall structure and increase the area available for heat dissipation and transfer from the interior of the heater to the surrounding water. A waterproof cable 4 is run into a top surface 3 of the case for supplying electric current to the heating structure therein. The feedthrough point of the cable is sealed against any ingress of water.

Reference numeral 6 denotes a wall of an aquarium and case 1 is fastened thereto by means of suction cups 5. The rear wall 7 of case 1 is provided with integral conical projections or posts 8 with heads 9, and the suction cups have appropriately countoured rear openings in order to snugly receive these posts. The cups 5 are preferably made of soft polyvinyl chloride. The back of head 9 as well as friction serve for retention of the respective suction cup on the post.

As can be seen from FIGS. 2 and 3, partitions 10 and 11 divide the interior of case 1 into an upper, a middle, and a lower chamber. Upper chamber or space 12 contains a temperature controller switch; the lower chamber or space 14 contains a heating element 15; and the intermediate chamber 13 thermally isolates the other two chambers from each other.

Heating element 15 includes a flat, plate-like core or carrier 16 onto which a heating filament 17 has been wound spirally in order to establish a heating coil. The two ends of heating filament and coil 17 are continued in two conductors 18 which are run through the partitions 10 and 11, traversing isolating chamber or space 13 for electrical connection to the temperature controller switch in chamber 12.

A temperature limit switch 19 is connected in series with one of the conductors. This switch 19 extends from partition 10 down into chamber 14 and interrupts the electric heating current whenever it senses a particular upper limit temperature in that lower chamber.

Two fastening ridges 20 and 21 extend from opposite sidewalls of upper chamber 12 and in parallel to partition 11 which is the bottom of that chamber. One of the conductors 18 is connected to a leaf spring 23 of a switch. One end of that spring is fastened to ridge 20. Contact 25 is connected to a lead 26, being one conductor of input cable 4. A second lead or conductor, 27, of cable 4 is directly connected to one of the conductors 18.

A bimetallic, resilient element and actuator 29, having an S-shaped crimp, is connected with one end to ridge 21 by means of a screw 28 to be held firmly on that ridge. The free end of bimetallic element 29 engages (normally) switch spring 23. A set screw 30, or the like, adjusts a tension bias for and of bimetallic actuator 29 by bearing against this resilient element. This adjusting screw 30 extends through a thicker portion of top wall 3.

The feedthrough and positioning of this screw includes appropriate sealing; for this, the screw has a cylindrical, unthreaded shank portion 31 which is surrounded by sealing rings 32. These rings bear against a cylindrical surface portion 33 in which the shank 31 is received. This shank portion 31 has a larger diameter than the threaded end of the adjusting screw 30.

The thicker top wall portion provided for receiving the screw includes also a space for insertion and embedding of a nut 34, in which the threaded portion of screw 30 runs and is threadedly held. The synthetic case material is unthreaded, threading for holding the screw is provided by this nut 34. The head of adjusting screw 30 is accessible from the outside and is appropriately configured to permit adjustment so that the bias of bimetallic element 29 is adjustable accordingly. By means of this feature, the temperature of response of the switch 23-24-25 can be adjusted, e.g., during calibration and/or subsequent use.

An integral sleeve 35 extends from the top 3, inwardly into chamber 12. This sleeve carries a lamp 36, such as a glow lamp, in friction fit. The connecting wires for this lamp are connected respectively to wire 27 and to the switch spring 23. When contacts 24 and 25 engage, the full operating voltage is applied to the lamp which, therefore, provides a visible indication of current flow through the heating coil. The sleeve 35 is closed at its top by a thin plastic wall portion, defined particularly by an indent 37 in top wall 3. This feature permits ready visibility of the lamp as the light will traverse that thin window. A special window, however, is not required.

The case as a whole is comprised of two open shells: an upper (or outer) shell 39 and a lower (or rear) shell 38. Reference numeral 41 refers to the interface between these shells when they are mounted together for completing the case. These shells are made of heat-resisting, waterproof plastic material such as a polyamid or a polyester. The following materials traded under these names are particularly suitable: Ultramid (Ultramid A 3 HG 5), Dyflor 2000, Dynalit G 30, and PPS Polyvinylidesulfate. Other materials of high heat resistance and waterproof consistency can also be used.

The core or carrier 16 for the heating coil is also made of plastic; e.g., any of the materials mentioned above or another one. It should be noted that resistance to water is not a requirement for this core and carrier.

Upon assembly, all individual parts are assembled preferably in one of the shells. The heating element (it may, in the alternative, be constructed as a heating foil) is separately mounted, e.g., on the core, and the core is (partially) embedded in chamber 14 by means of a synthetic resin or affixed to the one shell by spotwise application of a bonding agent or adhesive. Cable 4 is run into this shell and sealed, e.g., by means of a suitable sunthetic resin at sealing joint 42. Having anchored, fastened, and mounted the various elements inside one shell, the other shell is placed on top, and the two shells are welded together along joint 41. This way, the interior of the case is sealed and becomes waterproof. The suction cups are then placed onto posts 8.

As stated, one will next adjust the temperature of response for the switch by means of screw 30, and the exact turn-on position is obtained when the lamp 36 lights up.

Since the shells and case parts are made from plastic material, it is feasible to simply mold deflection surfaces to the outside. An example of these surfaces are the fins 40 which extend from the housing or case 1 in about the level of isolating chamber 13. It can readily be seen that water heated by element 15 will rise along the wide, outer surfaces of the case adjacent to heating chamber 14; and the rising water will be deflected away from the case by these fins 40. The heated water will, thus, not directly contact the outer walls of the upper chamber 12, there is other, cooler water in between. This feature in conjunction with the thermally isolating chamber 13 improves the thermal isolation of the switch in chamber 12. These particular fins and deflection surfaces 40 are shown here by way of example; others may be included for particularly imparting a definite flow circulation pattern upon the water in the aquarium.

As stated, the coil core 16 may well be made from the same material that the case shells are made of. This permits these parts to be welded together by means of one continuous weld. This particular feature avoids the separate embedding and/or bonding of the core 16 to the shell (38 or 39), which operation includes several, separately operating steps. Welding may, for instance, be carried out by means of ultrasonics.

The invention is not limited to the embodiments described above; but all changes and modifications thereof, not constituting departures from the spirit and scope of the invention, are intended to be included.

I claim:

1. A heater for an aquarium, comprising:
   a flat waterproof case being made of a synthetic plastic which is water-resisting and heat-resisting, and there being integral partitions in the case for establishing at least one larger and one smaller chamber,
   a flat heating element including a flat carrier mounted to the case in the larger chamber and an electrical heating filament attached to said carrier;
   a temperature controller mounted in the smaller chamber;
   connecting wires sealingly run into the smaller chamber and connected to the controller, the controller being additionally connected electrically to the heating element, and
   integral flow deflection means on an outside surface of the case near the partition to improve thermal insulation of the temperature controller in the smaller chamber.

2. A heater as in claim 1, wherein the heating filament is a heating coil wound around the carrier.

3. A heater as in claim 1 wherein the case being comprised of two welded-together shells.

4. A heater as in claim 1, wherein the flow deflector means includes stiffening ribs on at least one flat side of said case.

5. A heater as in claim 1 wherein the carrier being physically secured to the inside of the case.

6. A heater as in claim 1, wherein the temperature controller includes a leaf spring switch and with a bimetallic actuator operating the switch.

7. A heater as in claim 6, and including an externally accessable adjusting screw for adjusting resilient bias of the bimetallic actuator.

8. A heater as in claim 1 and including an indicator lamp electrically connected to the temperature controller and disposed inside the case.

9. A heater as in claim 6, including mounting ridges inside said small chamber, the switch being mounted on one of the ridges, the bimetallic actuator being mounted on another, oppositely located one of the ridges.

10. A heater as in claim 1, including posts extending from one flat side, and suction cups seated on and held by said posts, the posts including retention means for holding the suction cups.

* * * * *